Patented Sept. 13, 1932

1,877,179

UNITED STATES PATENT OFFICE

IRVIN W. HUMPHREY, OF WHARTON, NEW JERSEY, ASSIGNOR TO HERCULES POWDER COMPANY, OF WILMINGTON, DELAWARE, A CORPORATION OF DELAWARE

HYDROGENATED RESIN ESTERS AND METHOD OF PRODUCING

No Drawing.    Application filed January 16, 1929.  Serial No. 333,033.

My invention relates to hydrogenated esters of resin acids, as those of abietic acid, pimaric acid, the fossil resin acids, etc., prepared either by treating the hydrogenated resin acid with an alcohol, or by hydrogenating the resin ester, as a new product of manufacture and to a method for producing the same.

Hydrogenated esters of resin acids according to my invention have not heretofore been known, and according to my investigations I have found that they have substantial advantage in the commercial arts over the generally known ester gums. The hydrogenated esters of abietic acid, for example, have special advantage in that on exposure their protective coatings retain their flexibility for a longer period than when the non-hydrogenated esters are employed, while, at the same time, they possess otherwise the advantages of the known ester gums.

The hydrogenated esters in accordance with my invention may be produced by esterifying a hydrogenated resin acid, as for example, dihydro- or tetrahydro-abietic acid with an alcohol, as for example, ethyl, butyl, propyl, amyl, fenchyl, etc., or with a polyhydric alcohol, as a glycol, glycerol, pentaerythrite, mannitol, xylitol, anneaheptite, etc. Alternatively a resin acid, as abietic acid, pimaric acid, etc., may be esterified with an alcohol and the ester formed subsequently hydrogenated. Hydrogenation of the esters will be usually effected in the liquid phase, but in the case of volatile esters, as for example, ethyl abietate, it is possible to effect hydrogenation in the vapor phase. Further, hydrogenation may be combined with esterification, as by heating the resin acid with an alcohol at atmospheric or higher pressure depending upon the boiling point of the alcohol, in the presence of a suitable catalyst, as platinum, nickel, palladium, etc. while treating with hydrogen.

The hydrogenated esters may be prepared in accordance with the method embodying my invention, for example, by esterifying dihydro- or tetrahydro-abietic acid with, for example, amyl alcohol. As illustrative of the practial adaptation of the method in accordance with my invention, for example, 300 g. of hydrogenated resin, or dihydro-abietic acid, 900 g. of amyl alcohol and 10 g. of boric anhydride are refluxed for about twenty-five hours. About 25 g. of soda ash is then added, the alcohol distilled off and the ester distilled under reduced pressure with a yield of about 225 g. of amyl dihydro-abietate, acid number about 10.

As a further illustration the ethyl ester of dihydro-abietic acid may be prepared by dissolving 40 parts of sodium hydroxide in 400 parts of ethyl alcohol and then dissolving in the solution 300 parts of hydrogenated resin or of dihydro-abietic acid. To the solution thus formed 80 parts of ethyl chloride are added and the solution is heated in an autoclave at about 150° C. under a pressure of about 170 pounds for one hour. After the completion of the heating the sodium chloride formed is filtered off, about 10 g. of soda ash is added, the alcohol is distilled off and the ester distilled under reduced pressure with a yield of about 260 parts of ethyl dihydro-abietate, acid number 6.

As a further illustration, for example, in the preparation of methyl dihydro-abietate, 20 parts of sodium hydroxide, 250 parts of ethyl alcohol and 150 parts of hydrogenated resin or dihydro-abietic acid are refluxed until a clear solution is obtained, after which 45 parts of dimethyl sulphate are gradually added and the mixture heated for a period of about 5 hours. On completion of the heating period about 8 parts of soda ash are added, the alcohol distilled off and the ester formed distilled off under reduced pressure. A yield of about 120 parts of methyl dihydro-abietate, acid number 5, will be obtained.

The hydrogenated esters in accordance with my invention may, for example, be prepared by first esterifying a resin acid, as abietic acid, pimaric acid, etc., for example, by the method given above using a resin as such, or abietic acid, pimaric acid, or the like, and then subjecting the ester produced to hydrogenation. The ester may be hydrogenated by treating with hydrogen in the presence of a catalyst, as for example, palladium, platinum, nickel, cobalt, nickel-copper, or the like, at room or elevated temperature and under atmospheric or increased pressure, depending upon the catalyst used.

In effecting hydrogenation of the ester, for example, if palladium be used as the catalyst the hydrogenation may be effected at room temperature and under atmospheric pressure, while if a catalyst containing nickel is used a temperature within about the range 200° C.–300° C. will be necessary, though the hydrogenation may be effected under atmospheric pressure. In effecting the hydrogenation increased pressure will be found advantageous and the hydrogenation may be effected at pressures say within about the range 30–200 pounds per square inch.

As illustrative of the preparation of a hydrogenated ester by hydrogenating an ester, for example, about 2% of catalytic nickel is added to the glycerol, or ethyl ester of abietic acid, prepared by esterifying resin, as such, or abietic acid, and the ester heated to a temperature of about 250° C. under atmospheric pressure for about 15 hours, while passing in a current of hydrogen. The time required to effect hydrogenation of the ester may be shortened by hydrogenating under increased pressure and the ester may, if desired, be treated in solution in, for example, alcohol, acetic acid, ethyl acetate, an ether, or the like.

In the hydrogenation of the ester, for example, ethyl abietate, which possesses two unsaturated double bonds, by treatment with hydrogen, it will be found that the ester will absorb hydrogen rather rapidly until one double bond is saturated, forming ethyl dihydroabietate, and thereafter only a little more hydrogen will be absorbed under the usual conditions of hydrogenation.

The formation of the ester of tetrahydroabietic acid is favored by using a solvent, as suggested above, and hydrogenating for a longer period under pressure. For some purposes the tetrahydro ester is better than the dihydro ester.

The hydrogenated esters in accordance with my invention are admirably adapted as ingredients for coating compositions, as in varnishes and lacquers in substitution for resin esters and fossil resins, and in some cases will be found valuable as plasticizers.

It will be understood that the esters in accordance with my invention may be produced from resin acids, as contained in resins, as resin, fossil resins, etc., or from the resin acids, as such, as abietic acid, pimaric acid, etc.

I have not herein claimed the method involving hydrogenation of abietic acid or resin and subsequent esterification thereof, as such forms the subject matter of an application for patent filed by me April 15, 1932, Serial No. 605,547 as a division of this application.

Having now fully described my invention, what I claim and desire to protect by Letters Patent is:

1. As a new product an ester of dihydroabietic acid.
2. As a new product the ethyl ester of dihydro-abietic acid.
3. As a new product an alkyl ester of dihydro-abietic acid.
4. As a new product an alkyl ester of hydrogenated resin.
5. As a new product the ethyl ester of hydrogenated resin.
6. The method of preparing a hydrogenated abietic acid ester which includes forming an alkyl ester of abietic acid and hydrogenating the unsaturated bonds in the abietyl radical in the presence of a hydrogenation catalyst.
7. The method of preparing a hydrogenated abietic acid ester which includes forming an alkyl ester of abietic acid and heating the ester with hydrogen under a pressure of 30–200 pounds in the presence of a nickel hydrogenation catalyst.
8. The method of preparing a hydrogenated abietic acid ester which includes forming an ethyl ester of abietic acid and heating the ester with hydrogen under a pressure of 30–200 pounds in the presence of a nickel hydrogenation catalyst.
9. The method of preparing a hydrogenated abietic acid ester which includes forming a methyl ester of abietic acid and heating the ester with hydrogen under a pressure of 30–200 pounds in the presence of a nickel hydrogenation catalyst.
10. The method of preparing a hydrogenated abietic acid ester which includes forming an ethyl ester of abietic acid and hydrogenating the unsaturated bonds in the abietyl radical in the presence of a hydrogenation catalyst.
11. The method of preparing a hydrogenated abietic acid ester which includes forming a methyl ester of abietic acid and hydrogenating the unsaturated bonds in the abietyl radical in the presence of a hydrogenation catalyst.
12. The method of preparing a hydrogenated abietic acid ester which includes forming an ethyl ester of abietic acid and heating the ester with hydrogen under pressure.
13. The method of preparing a hydrogenated abietic acid ester which includes forming a methyl ester of abietic acid and heating the ester with hydrogen under pressure.
14. The method of preparing a hydrogenated abietic acid ester which includes forming an ethyl ester of abietic acid and heating the ester with hydrogen under pressure in the presence of a hydrogenation catalyst.
15. The method of preparing a hydrogenated abietic acid ester which includes forming a methyl ester of abietic acid and heating the ester with hydrogen under pressure in the presence of a hydrogenation catalyst.
16. The method of preparing a hydrogenated abietic acid ester which includes forming an ethyl ester of abietic acid and heating the ester with hydrogen under pressure in the presence of a nickel hydrogenation catalyst.

17. The method of preparing a hydrogenated abietic acid ester which includes forming a methyl ester of abietic acid and heating the ester with hydrogen under pressure in the presence of a nickel hydrogenation catalyst.

18. The method of preparing a hydrogenated abietic acid ester which includes forming an alkyl ester of abietic acid and heating the ester with hydrogen under a pressure above atmospheric of 30–200 pounds in the presence of a nickel hydrogenation catalyst to effect reduction of the unsaturation of the bonds in the abietyl radical of the ester.

19. As a new product an alkyl ester of abietic acid, the unsaturation of the bonds in the abietyl radical of which has been decreased by hydrogenation.

20. As a new product an alkyl ester of resin, the unsaturation of the bonds in the abietyl radical of which has been decreased by hydrogenation.

21. As a new product an aliphatic alcohol ester of abietic acid, the unsaturation of the bonds in the abietyl radical of which has been decreased by hydrogenation.

22. As a new product an aliphatic monohydric alcohol ester of abietic acid, the unsaturation of the bonds in the abietyl radical of which has been descreased by hydrogenation.

23. As a new product an aliphatic alcohol ester of resin, the unsaturation of the bonds in the abietyl radical of which has been decreased by hydrogenation.

24. As a new product an aliphatic monohydric alcohol ester of resin, the unsaturation of the bonds in the abietyl radical of which has been decreased by hydrogenation.

25. As a new product the methyl ester of dihydro-abietic acid.

26. As a new product the methyl ester of hydrogenated resin.

27. As a new product the butyl ester of dihydro-abietic acid.

28. As a new product the butyl ester of hydrogenated resin.

29. As a new product an ethyl ester of abietic acid, the unsaturation of the bonds in the abietyl radical of which has been decreased by hydrogenation.

30. As a new product a methyl ester of abietic acid, the unsaturation of the bonds in the abietyl radical of which has been decreased by hydrogenation.

31. As a new product a butyl ester of abietic acid, the unsaturation of the bonds in the abietyl radical of which has been decreased by hydrogenation.

32. As a new product an ethyl ester of resin, the unsaturation of the bonds in the abietyl radical of which has been decreased by hydrogenation.

33. As a new product a methyl ester of resin, the unsaturation of the bonds in the abietyl radical of which has been decreased by hydrogenation.

34. As a new product a butyl ester of resin, the unsaturation of the bonds in the abietyl radical of which has been decreased by hydrogenation.

35. The method of preparing a hydrogenated abietic acid ester which includes forming a butyl ester of abietic acid and hydrogenating the unsaturated bonds in the abietyl radical in the presence of a hydrogenation catalyst.

36. The method of preparing a hydrogenated abietic acid ester which includes forming a butyl ester of abietic acid and heating the ester with hydrogen under pressure in the presence of a hydrogenation catalyst.

37. The method of preparing a hydrogenated abietic acid ester which includes forming a butyl ester of abietic acid and heating the ester with hydrogen under pressure in the presence of a nickel hydrogenation catalyst.

38. The method of preparing a hydrogenated abietic acid ester which includes forming an alkyl ester of resin and hydrogenating the unsaturated bonds in the abietyl radical thereof in the presence of a hydrogenation catalyst.

39. The method of preparing a hydrogenated abietic acid ester which includes forming an aliphatic alcohol ester of abietic acid and hydrogenating the unsaturated bonds of the abietyl radical thereof in the presence of a nickel hydrogenating catalyst.

40. The method of preparing a hydrogenated abietic acid ester which includes forming an aliphatic alcohol ester of resin and reducing the unsaturation of the bonds of the abietyl radical thereof in the presence of a nickel hydrogenating catalyst.

41. The process of making a hydrogenated ester which includes esterifying resin with a saturated aliphatic alcohol and then treating the unsaturated resin ester with hydrogen under pressure in the presence of a hydrogenation catalyst to effect reduction of the unsaturation of the resin acid radical.

42. The process of making a hydrogenated ester which includes esterifying resin with a saturated aliphatic monohydric alcohol and then treating the unsaturated resin ester with hydrogen under pressure in the presence of a hydrogenation catalyst to effect reduction of the unsaturation of the resin acid radical.

43. The process of making a hydrogenated ester which includes esterifying resin with a saturated aliphatic alcohol and then treating the unsaturated resin ester with hydrogen under pressure in the presence of a nickel hydrogenation catalyst to effect reduction of the unsaturation of the resin acid radical.

44. The process of making a hydrogenated ester which includes esterifying resin with a saturated aliphatic monohydric alcohol and then treating the unsaturated resin ester with hydrogen under pressure in the presence of a nickel hydrogenation catalyst to effect reduction of the unsaturation of the resin acid radical.

45. The process of making a hydrogenated ethyl ester which includes forming an ethyl ester from resin and treating the ester with hydrogen in the presence of a hydrogenation catalyst to effect reduction of the unsaturation of the resin acid radical.

46. The process of making a hydrogenated ethyl ester which includes forming an ethyl ester from resin and treating the ester with hydrogen in the presence of a nickel hydrogenation catalyst to effect reduction of the unsaturation of the resin acid radical.

47. The process of making a hydrogenated methyl ester which includes forming a methyl ester from resin and treating the ester with hydrogen in the presence of a nickel hydrogenation catalyst to effect reduction of the saturation of the resin acid radical.

48. The process of making a hydrogenated butyl ester which includes forming a butyl ester from resin and treating the ester with hydrogen in the presence of a nickel hydrogenation catalyst to effect reduction of the unsaturation of the resin acid radical.

49. The method of preparing a hydrogenated abietic acid ester which includes forming an alkyl ester of abietic acid and hydrogenating the unsaturated bonds in the abietyl radical in the presence of a base metal hydrogenation catalyst.

50. The process of making a hydrogenated ester which includes esterifying resin with a saturated aliphatic alcohol and then treating the unsaturated resin ester with hydrogen under pressure in the presence of a base metal hydrogenation catalyst to effect reduction of the unsaturation of the resin acid radical.

In testimony of which invention, I have hereunto set my hand, at Kenvil, N. J., on this 3rd day of January, 1929.

IRVIN W. HUMPHREY.